United States Patent
Ha et al.

(10) Patent No.: US 12,062,924 B2
(45) Date of Patent: Aug. 13, 2024

(54) ELECTRONIC DEVICE FOR WIRELESS POWER TRANSMISSION AND OPERATING METHOD THEREOF

(71) Applicant: SAMSUNG ELECTRONICS CO., LTD., Suwon-si (KR)

(72) Inventors: Mincheol Ha, Suwon-si (KR); Dongzo Kim, Suwon-si (KR); Hyungkoo Chung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 35 days.

(21) Appl. No.: 18/088,623

(22) Filed: Dec. 26, 2022

(65) Prior Publication Data

US 2023/0126676 A1 Apr. 27, 2023

Related U.S. Application Data

(63) Continuation of application No. PCT/KR2021/005691, filed on May 6, 2021.

(30) Foreign Application Priority Data

Jun. 26, 2020 (KR) .......................... 10-2020-0078631

(51) Int. Cl.
*H02J 50/12* (2016.01)
*H02J 50/50* (2016.01)
(Continued)

(52) U.S. Cl.
CPC ............ *H02J 50/12* (2016.02); *H02J 50/502* (2020.01); *H02J 50/80* (2016.02); *H02J 50/90* (2016.02)

(58) Field of Classification Search
CPC ...................................................... H02J 50/12
(Continued)

(56) References Cited

U.S. PATENT DOCUMENTS

2015/0008751 A1* 1/2015 Widmer ................. H02J 50/12
 307/104
2015/0214749 A1 7/2015 Park et al.
(Continued)

FOREIGN PATENT DOCUMENTS

JP 2007206776 A 8/2007
JP 2008167582 A 7/2008
(Continued)

OTHER PUBLICATIONS

International Search Report mailed Aug. 24, 2021 for PCT/KR2021/005691.
(Continued)

*Primary Examiner* — Joseph Chang
(74) *Attorney, Agent, or Firm* — CANTOR COLBURN LLP

(57) ABSTRACT

An electronic device according to various embodiments include a sensor, a first magnetic element which can be rotated to have a polarity of a first pole or a second pole in a first direction, and a processor. When the first magnetic element is aligned in the first direction by a magnetic force generated due to the approach of a second magnetic element included in an external electronic device, the processor is configured to identify the strength of the magnetic force and the polarity of the first magnetic element corresponding to the magnetic force by means of the sensor, select any one of a plurality of power transmission methods on the basis of the strength of the magnetic force and the polarity, and transmit power to the external electronic device wirelessly on the basis of the power transmission method.

20 Claims, 13 Drawing Sheets

(51) Int. Cl.
*H02J 50/80* (2016.01)
*H02J 50/90* (2016.01)

(58) Field of Classification Search
USPC .......................................................... 307/104
See application file for complete search history.

(56) References Cited

U.S. PATENT DOCUMENTS

| | | | |
|---|---|---|---|
| 2016/0243949 A1* | 8/2016 | Merkel | ................... H02J 50/90 |
| 2017/0264046 A1 | 9/2017 | Szeto | |
| 2018/0138749 A1 | 5/2018 | Lee et al. | |
| 2018/0213313 A1 | 7/2018 | Andrikowich et al. | |
| 2019/0067994 A1 | 2/2019 | Song et al. | |
| 2019/0199134 A1* | 6/2019 | Lethellier | ............. H01F 27/363 |
| 2020/0227954 A1* | 7/2020 | Ding | ....................... H02J 50/10 |

FOREIGN PATENT DOCUMENTS

| | | |
|---|---|---|
| JP | 201423281 A | 2/2014 |
| KR | 1020120100217 A | 9/2012 |
| KR | 1020120127233 A | 11/2012 |
| KR | 1020130075077 A | 7/2013 |
| KR | 1020170013550 A | 2/2017 |
| KR | 1020200066118 A | 6/2020 |
| WO | 2009049281 A2 | 4/2009 |
| WO | 2019064199 A2 | 4/2019 |
| WO | 2019064199 A3 | 5/2019 |

OTHER PUBLICATIONS

European Search Report for International Application No. PCT/KR2021/005691; International filing date May 6, 2021; Date of Mailing Jan. 8, 2024; 5 Pages.

* cited by examiner

ELECTRONIC DEVICE FOR WIRELESS POWER TRANSMISSION AND OPERATING METHOD THEREOF

CROSS-REFERENCE TO RELATED APPLICATION(S)

This application is a continuation application, claiming priority under § 365(c), of an International application No. PCT/KR2021/005691, filed on May 6, 2021, which is based on and claims the benefit of a Korean patent application number 10-2020-0078631, filed on Jun. 26, 2020, in the Korean Intellectual Property Office, the disclosure of which is incorporated by reference herein in its entirety.

BACKGROUND

Various embodiments relate to an electronic device and a method for wirelessly transmitting power.

With the development of wireless power transmission technology, many electronic devices have recently used the wireless power transmission technology for wireless charging or non-contact charging. The wireless power transmission technology is a technology which converts electric energy into a form of electromagnetic waves having a frequency and wirelessly transfers the converted energy to a load (for example, an external electronic device) without a transmission line. The wireless power transmission technology may be a technology in which power is wirelessly transferred from a power transmission device to a power reception device without a connection between the power reception device and the power transmission device via a separate connector, so that a battery of the power reception device is charged. The wireless power transmission technology may include a magnetic induction scheme and a magnetic resonance scheme, and there may be various other types of wireless power transmission technologies.

A magnetic induction type wireless power transmission system uses a scheme of transferring power by using a magnetic field induced in a coil, and is a technology which, using a magnetic field generated by a current flowing through a transmission coil, generates an electromotive force in a reception coil to cause an induced current to flow therethrough, so as to provide energy to a load (for example, an external electronic device). Representative standards of the magnetic induction scheme include wireless power consortium (WPC), power matters alliance (PMA), or the like, and a designated frequency band such as 110 to 205 kHz for WPC, and 227 to 357 kHz, and 118 to 153 kHz for PMA may be used as a frequency used for power transmission.

SUMMARY

Electronic devices (for example, a wearable electronic device) capable of wireless power transmission may use different communication protocols and frequencies of signals for wireless power transmission according to manufacturers thereof. For a single power transmission device capable of supporting a plurality of power transmission schemes, the power transmission device may require increased design difficulty and complexity in order to identify a power transmission scheme suitable for a power reception device. Alternatively, for a single power transmission device capable of supporting multiple power transmission schemes, the time required to start charging may be increased because communication methods and configuration schemes of the multiple power transmission schemes are different.

In an electronic device (for example, a wearable electronic device) capable of wireless power transmission, magnets having different polarities may be inserted in a power transmission device and a power reception device, respectively, and the power transmission device and the power reception device may be fixedly positioned using the magnets, in order to achieve efficient power transmission and minimize the phenomenon of induction heating. In supporting a plurality of power transmission schemes by a single power transmission device, magnets having the same polarity are inserted in a power transmission device and a power reception device, mounting of the power reception device for wireless power transmission may be impossible.

Various embodiments provide a power transmission device and an operating method thereof, wherein the power transmission device includes a rotatable magnet. When a power reception device is mounted on the power transmission device using the magnet, the power reception device can identify the polarity of the magnet included in the power transmission device and determine a power transmission scheme suitable for the wireless power reception device among a plurality of power transmission schemes.

An electronic device according to various embodiments includes a sensor, a first magnetic element which can be rotated to have a polarity of one of a first pole and a second pole in a first direction, and a processor, wherein the processor is configured to, identify, through the sensor, a polarity of a one of first magnetic element and a second magnetic element and a strength of a magnetic force generated by approaching of the second magnetic element to the first magnetic element, the polarity being determined by the magnetic force, the second magnetic element being included in an external electronic device, determine a power transmission scheme among a plurality of power transmission schemes, based on the polarity and the strength of the magnetic force, and wirelessly transmit power to the external electronic device, based on the power transmission scheme.

An operating method of an electronic device including a first magnetic element which can be rotated to have a polarity of one of a first pole and a second pole in a first direction according to various embodiments includes identifying a polarity of one of a first magnetic element and a second magnetic element and a strength of a magnetic force generated by approaching of the second magnetic element to the first magnetic element, the polarity being determined by the magnetic force, the second magnetic element being included in an external electronic device, determining a power transmission scheme among a plurality of power transmission schemes, based on the polarity and the strength of the magnetic force, and wirelessly transmitting power to the external electronic device, based on the power transmission scheme.

A computer-readable recording medium according to various embodiments stores instructions configured to, when executed, cause a processor to: identify a polarity of one of a first magnetic element and a second magnetic element and a strength of a magnetic force generated by approaching of the second magnetic element to the first magnetic element, the polarity being determined by the magnetic force, the first magnetic element being included in an electronic device and being rotatable in a first direction to have a polarity of one of a first pole and a second pole, the second magnetic element being included in an external electronic device;

determine a power transmission scheme among a plurality of power transmission schemes, based on the polarity and the strength of the magnetic force; and wirelessly transmit power to the external electronic device, based on the power transmission scheme.

A power transmission device according to various embodiments includes a rotatable magnet and, when a power reception device is mounted on the power transmission device using the magnet, the power transmission device is able to detect a change in magnetic flux by using a sensor, and determine a power transmission scheme suitable for the wireless power reception device among a plurality of power transmission schemes.

The power transmission device according to various embodiments is able to support a plurality of power transmission schemes, and efficiently determine a power transmission scheme suitable for the power reception device.

DETAILED DESCRIPTION

Figure 1:
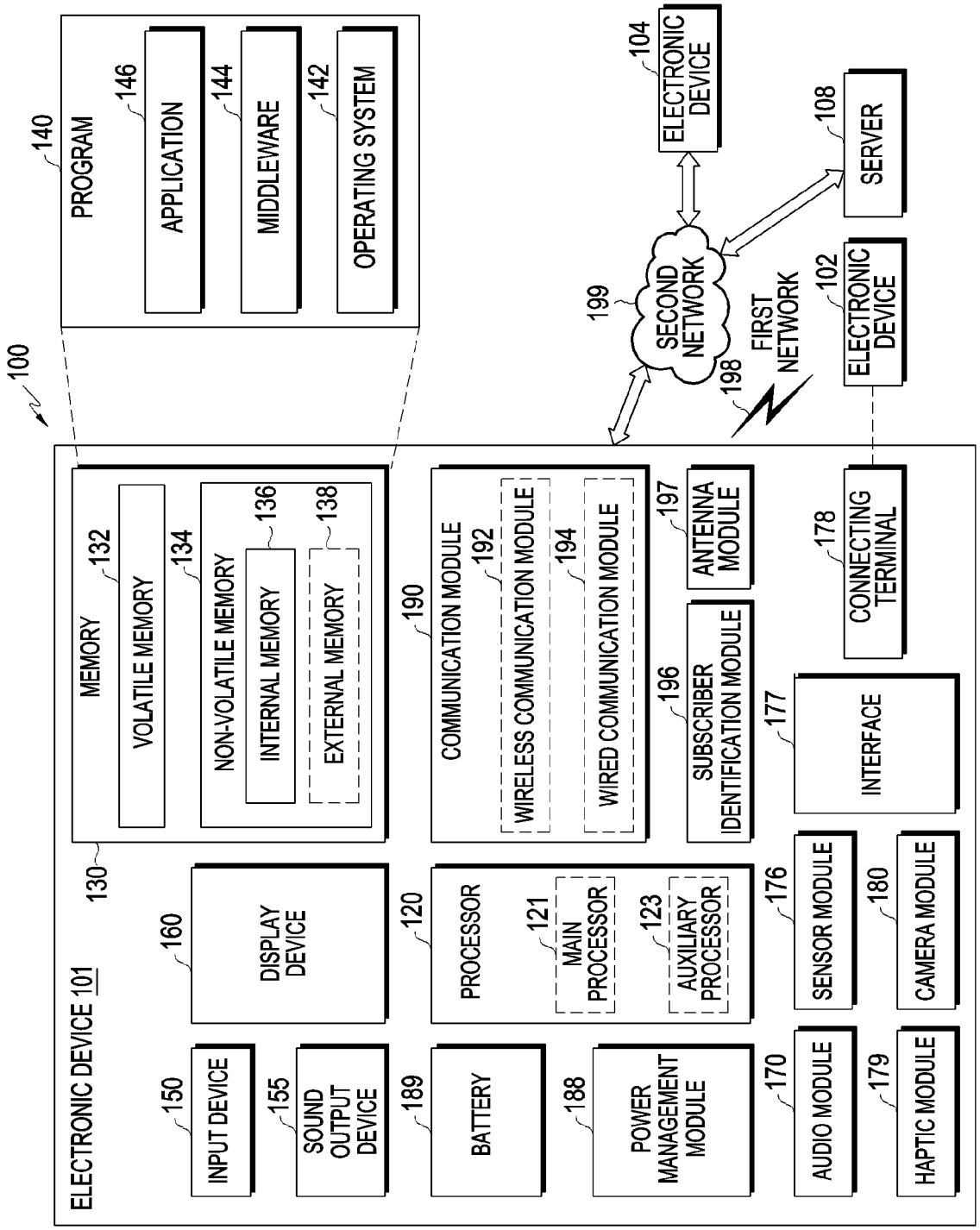
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
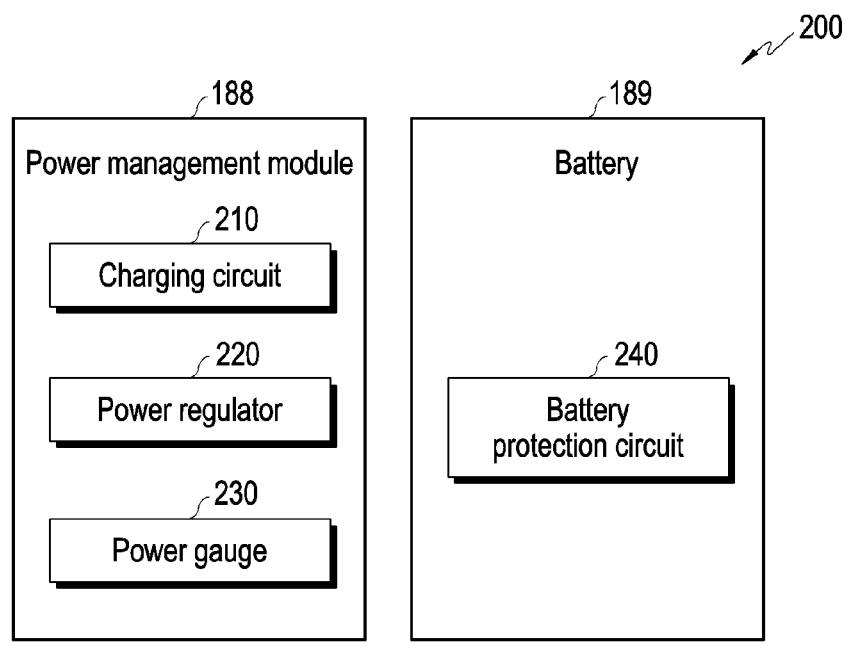
FIG. 2 is a block diagram of a power management module and a battery according to various embodiments.

FIG. 2 is a block diagram 200 illustrating the power management module 188 and the battery 189 according to various embodiments.

Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least a part of the use state information or the charging state information of the battery 189 may be measured using a corresponding sensor (e.g., a temperature sensor) among the sensor modules 176, the power gauge 230, or the power management module 188. According to an embodiment, the corresponding sensor (e.g., the temperature sensor) among the sensor modules 176 may be included as a part of the battery protection circuit module 240, or may be disposed in the vicinity of the battery 189 as a separate device.

Figure 3:
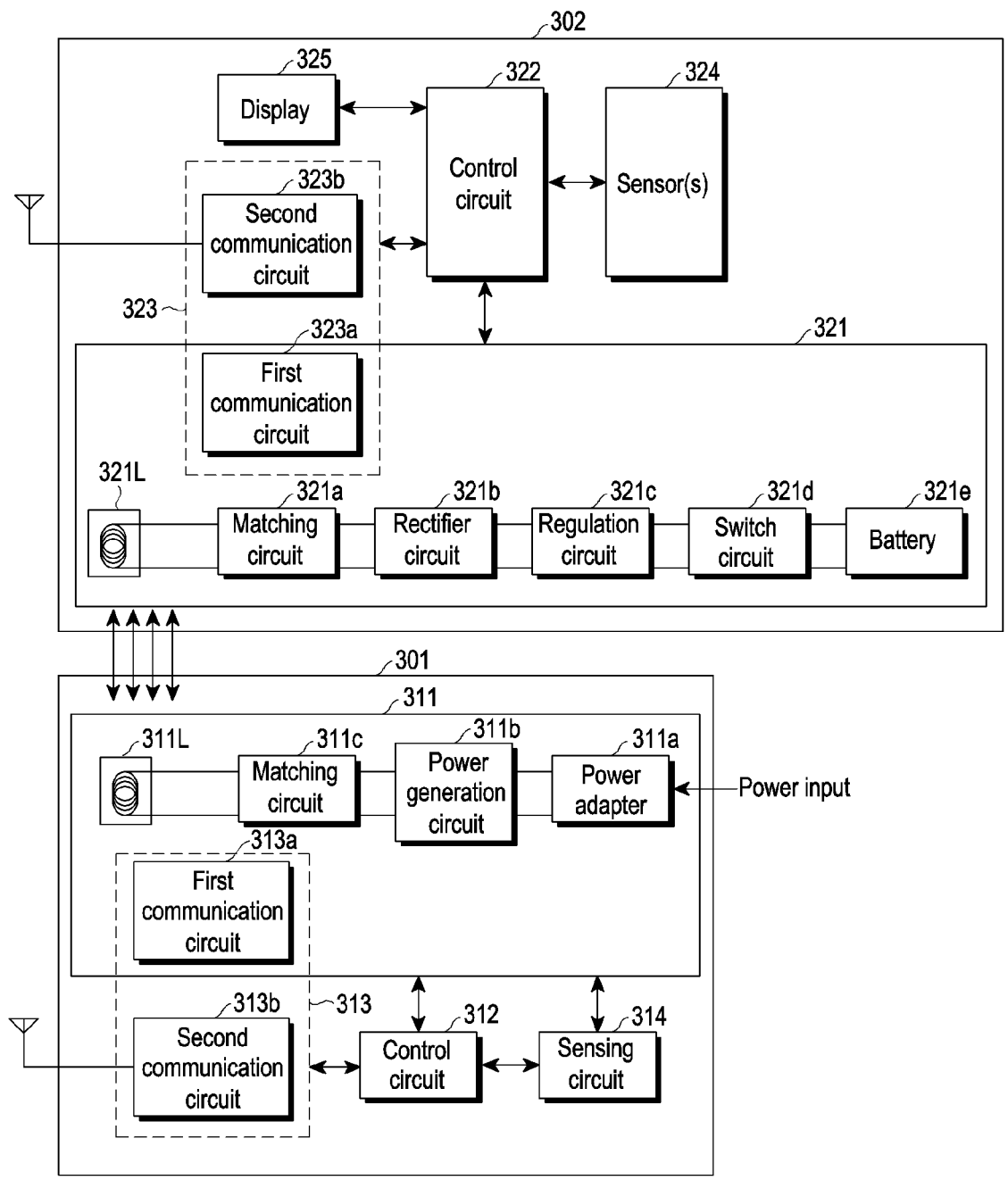
FIG. 3 is a diagram illustrating a wireless charging system according to various embodiments.

According to an embodiment, the power management module 188 may further include a power transmission circuit (for example, a power transmission circuit 311 of FIG. 3). The power transmission circuit 311 may include a power adapter configured to receive an input of a power source (or power) from the battery 189 and appropriately convert a voltage of the input power source, a power generation circuit configured to generate power, and/or a matching circuit configured to wirelessly transmit the generated power to an external electronic device (e.g., the electronic device 102 of FIG. 1). The power transmission circuit 311 may transmit the generated power to the external electronic device by maximizing the efficiency between a transmission coil and a reception coil of the external electronic device through the matching circuit.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

The electronic device according to various embodiments may be a part of a plate-type/bar-type electronic device, a rollable electronic device, or a foldable electronic device. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 3 is a diagram illustrating a wireless charging system according to various embodiments.

Referring to FIG. 3, an electronic device 301 (for example, 102 of FIG. 1) (hereinafter also referred to as a "power transmission device") according to various embodiments is configured to wirelessly supply power to an external electronic device 302 (for example, 101 of FIG. 1) (hereinafter also referred to as "power reception device"), and the external electronic device 302 is configured to wirelessly receive power.

According to various embodiments, the power transmission device 301 may correspond to a wireless power receiver or a power reception device. For example, when the power transmission device 301 corresponds to the wireless power receiver or the power reception device, the power transmission device 301 may be applied to elements of the power reception device 302 required for power reception.

According to various embodiments, the power transmission device 301 may include the power transmission circuit 311, a control circuit 312, a communication circuit 313, and/or a sensing circuit 314.

According to various embodiments, the power transmission circuit 311 may include a power adapter 311a configured to receive an input of a power source (or power) from the outside and appropriately convert a voltage of the input power source, a power generation circuit 311b configured to generate power, and/or a matching circuit 311c configured to maximize the efficiency between a transmission coil 311L and a reception coil 321L.

According to various embodiments, the power transmission circuit 311 may include a plurality of at least a part of the power adapter 311a, the power generation circuit 311b, the transmission coil 311L, or the matching circuit 311c, so as to enable power transmission to a plurality of power reception devices (for example, a first external electronic device and a second external electronic device). The power generation circuit 311b may convert power received from the power adapter 311a into, for example, an alternating current waveform, and/or amplify and transfer the alternating current waveform to the transmission coil 311L. A frequency of the alternating current waveform may be configured to be about 100 to 205 kHz or about 6.78 MHz according to a standard, but is not limited thereto. The power generation circuit 311b may include an inverter. For example, the inverter may be a full-bridge inverter or a half-bridge inverter, but the type of the inverter is not limited to these types of inverters. When power is applied to the transmission coil 311L, an induced magnetic field having a size which changes according to time may be formed from the transmission coil 311L, and thus the power may be wirelessly transmitted. Although not shown, at least one capacitor configuring a resonance circuit together with the transmission coil 311L may be further included in the power transmission circuit 311. The matching circuit 311c may change at least one of capacitance or reactance of a circuit connected to the transmission coil 311L under the control of the control circuit 312, so as to control the power transmission circuit 311 and a power reception circuit 321 to be impedance-matched with each other. In the reception coil 321L of the power reception circuit 321, an induced electromotive force may be generated by a magnetic field formed in the surroundings and having a size which changes according to time, and accordingly, the power reception circuit 321 may receive power wirelessly.

According to various embodiments, the power transmission circuit 311 may support a plurality of power transmission schemes by using the power generation circuit 311b. For example, the power transmission circuit 311 may transmit power by using a power transmission scheme suitable for an external electronic device among the plurality of power transmission schemes. For example, the plurality of power transmission schemes may include a scheme of wirelessly transmitting power by using a magnetic induction scheme and/or a resonance induction scheme.

According to various embodiments, the power transmission circuit 311 may use the power generation circuit 311b to generate signals of a first frequency band for providing a first power to a first external electronic device (for example, the power reception device 302) and signals of a second frequency band for providing a second power to a second external electronic device (not shown). For example, the control circuit 312 may output a first signal (hereinafter also referred to as a "ping signal") for identifying approach of an external object in a ping phase (e.g., a standby power state) at each designated period through the transmission coil 311L in order to wirelessly transmit power, output a signal associated with authentication in an authentication state (identification & configuration phase), and output a second signal (power signal) for power transmission in a power transmission state (power transfer phase). That is, the control circuit 312 may output a first signal and a second signal of the first frequency band or the second frequency band according to each power transmission scheme. For example, the first frequency band and the second frequency band may be different from each other.

According to various embodiments, the control circuit 312 may perform the overall control of the power transmission device 301, and generate various messages required for wireless power transmission to transfer the messages to the communication circuit 313. For example, the control circuit 312 may be implemented to be identical or similar to the processor 120 of FIG. 1. In an embodiment, the control circuit 312 may calculate power (or an amount of power) to be transmitted to the power reception device 302, based on information received from the communication circuit 313. In an embodiment, the control circuit 312 may control the power transmission circuit 311 so that the power transmitted by the transmission coil 311L is transmitted to the power reception device 302.

According to various embodiments, when power is transmitted to one power reception device among a plurality of power reception devices (for example, a first external electronic device and a second external electronic device) each having a different power transmission scheme, the control circuit 312 may control the power generation circuit 311b so as to generate a first signal and a second signal in a frequency band corresponding to each power transmission scheme.

According to various embodiments, the communication circuit 313 may include at least one of a first communication circuit 313a and a second communication circuit 313b. The first communication circuit 313a may communicate with a first communication circuit 323a of the power reception device 302 by using, for example, a frequency which is the same as or adjacent to a frequency used for power transmission in the transmission coil 311L (e.g., an in-band scheme). In an embodiment, the second communication circuit 323a may communicate with a second communication circuit 323b of the power reception device 302 by using, for example, a frequency which is different from a frequency used for power transmission in the transmission coil 311L (e.g., an out-band scheme). For example, the second communication circuit 313b may use one of various short-range communication schemes, such as Bluetooth, BLE, Wi-Fi, and NFC, to obtain information (e.g., Vrec information, Tout information, various packets, a message, etc.) related to a charging state from the second communication circuit 323b. According to an embodiment, the first communication circuit 313a may be included in the power transmission circuit 311, and the first communication circuit 313a may communicate with the first communication circuit 323a of the power reception device 302.

According to various embodiments, the sensing circuit 314 may include at least one sensor, and may detect at least one state of the power transmission device 301 by using the at least one sensor.

According to various embodiments, the sensing circuit 314 may include at least one of a Hall sensor, a magnetic force sensor, a temperature sensor, a motion sensor, or a current (or voltage) sensor, and may identify a power transmission scheme of the power reception circuit 321 through the Hall sensor (or the magnetic force sensor), detect a temperature state of the power transmission device 301 by using the temperature sensor, detect a motion state of the power transmission device 301 by using the motion sensor, and detect a state of an output signal of the power transmission device 301, such as a current magnitude, a voltage magnitude, or a power magnitude, by using the current (or voltage) sensor.

According to an embodiment, the current (or voltage) sensor may measure a signal in the power transmission circuit 311. A signal may be measured in at least a partial area of the transmission coil 311L, the matching circuit 311c, or the power generation circuit 311b. For example, the current (or voltage) sensor may include a circuit configured to measure a signal at the front end of the transmission coil 311L.

According to various embodiments, the sensing circuit 314 may be a circuit for foreign object detection (FOD). The power transmission device 301 may measure a current and a voltage of the power transmission circuit 311 through the sensing circuit 314 and obtain a magnitude of power transmitted by the power transmission device 301, based on the measured current and voltage. When an external object exists between the power transmission device 301 and the power reception device 302, a magnitude of lost power representing a difference between power transmitted by the power transmission device 301 and power received by the power reception device 302 may increase. The power transmission device 301 may stop power transmission when the lost power exceeds a designated threshold value. The power transmission device 301 may receive information related to power received from the power reception device 302 through the communication circuit 313.

According to an embodiment, the sensing circuit 314 may measure a current and a voltage applied to the power transmission circuit 311 (e.g., the power generation circuit 311b or the transmission coil 311L) by a change of the power reception device 302, so as to detect a change in the power reception device 302.

According to various embodiments, the power reception device 302 (e.g., 101 of FIG. 1) may include the power reception circuit 321 (e.g., the power management module 188), a control circuit 322 (e.g., the processor 120), a communication circuit 323 (e.g., the communication module 190), at least one sensor 324 (e.g., the sensor module 176), or a display 325 (e.g., the display device 160). In relation to the power reception device 302, the description of the configuration corresponding to the power transmission device 301 may be partially omitted.

According to various embodiments, the power reception device 302 may correspond to a wireless power transmitter or a power transmission device. When the power reception device 302 corresponds to the wireless power transmitter or the power transmission device, the power reception device 302 may include elements of the power transmission device 301 required for power transmission.

According to various embodiments, the power reception circuit 321 may include the reception coil 321L configured to wirelessly receive power from the power transmission device 301, a matching circuit 321a, a rectifier circuit 321b configured to rectify a received AC power to a DC, a regulating circuit 321c configured to regulate a charging voltage, a switch circuit 321d, and/or a battery 321e (e.g., the battery 189).

According to various embodiments, the control circuit 322 may perform the overall control of the power reception device 302, and generate various messages required for wireless power reception to transfer the messages to the communication circuit 323.

According to various embodiments, the communication circuit 323 may include at least one of the first communication circuit 323a and the second communication circuit 323b. The first communication circuit 323a may communicate with the power transmission device 301 through the reception coil 321L. The second communication circuit 323b may communicate with the power transmission device 301 by using one of various short-range communication schemes such as Bluetooth, BLE, Wi-Fi, and NFC. According to an embodiment, the first communication circuit 323a may be included in the power reception circuit 321, and the first communication circuit 323a may communicate with the first communication circuit 313a of the power reception device 301.

According to various embodiments, the display 325 may display various display information required for wireless power transmission/reception.

According to various embodiments, the at least one sensor 324 may include at least a part of a current/voltage sensor, a temperature sensor, an illuminance sensor, or a sound sensor.

According to various embodiments, the at least one sensor 324 may detect the power transmission device 301 by detecting a discovery signal or received power from the power transmission device 301. The at least one sensor 324 may detect a signal change of an input/output terminal of the rectifier circuit 321b, the matching circuit 321a, or the reception coil 321L, generated by a signal output from the power transmission device 301. According to various embodiments, the at least one sensor 324 may be included in the power reception circuit 321.

Figure 4:
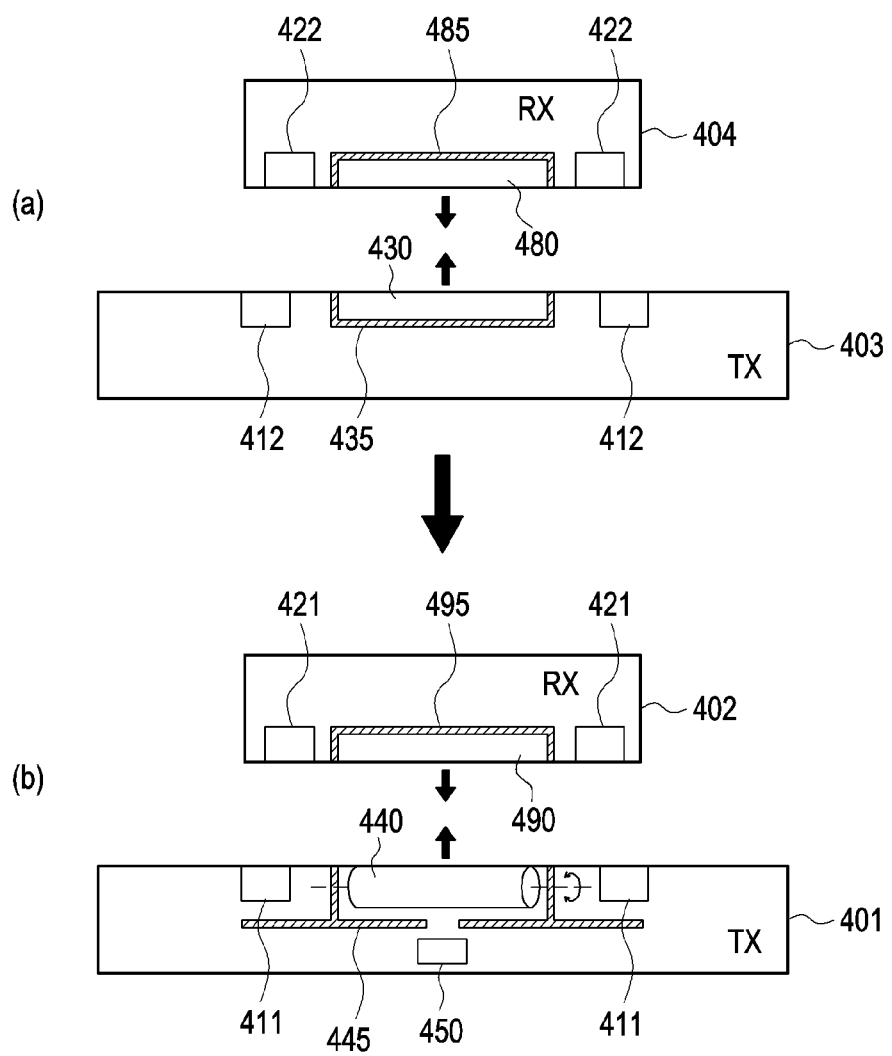
FIG. 4 is a diagram illustrating a wireless charging system according to various embodiments.

FIG. 4 is a diagram illustrating a wireless charging system according to various embodiments.

Referring to case (a) of FIG. 4, a power transmission device 403 may include a first magnetic element 430 having a first polarity (or a first pole). The power transmission device 403 may be disposed to be aligned with a power reception device 404 in order to wirelessly transmit power to the power reception device 404. For example, when power is wirelessly transmitted, the power transmission device 403 may use the first magnetic element 430 for placement for maximizing efficiency and/or minimizing the phenomenon of induction heating. That is, the first magnetic element 430 may be used so that the power transmission device 403 and the power reception device 404 are fixed at appropriate positions. For example, a wireless charging coil 412 included in the power transmission device 403 may be disposed in an annular shape without a central portion thereof like a donut, and the first magnetic element 430 may be positioned in the central portion where the wireless charging coil 412 does not exist. The first magnetic element 430 may include a shielding member 435 in the surroundings thereof so as not to affect a magnetic force of the wireless charging coil 412.

According to various embodiments, the power reception device 404 may include a second magnetic element 480 having a second polarity (or a second pole). For example, a wireless charging coil 422 included in the power transmission device 404 may be disposed in an annular shape without a central portion thereof like a donut, and the second magnetic element 480 may be positioned in the central portion where the wireless charging coil 422 does not exist. The second magnetic element 480 may include a shielding member 485 in the surroundings thereof so as not to affect a magnetic force of the wireless charging coil 422. For example, each of the power transmission device 403 and the power reception device 404 may include magnetic elements 430 and 480 having different polarities. For example, when the first polarity corresponds to an "N pole", the second polarity may correspond to an "S pole", and when the first polarity corresponds to an "S pole", the second polarity may correspond to an "N pole".

However, as shown in case (a) of FIG. 4, when the first magnetic element 430 has the first polarity, the power transmission device 403 may be aligned at a position where power transmission efficiency is highest, due to an attractive force between the magnetic elements 430 and 480 and the power reception device 404 including a magnetic element having the second polarity opposite to the first polarity. According to another embodiment, the power transmission device 403 may not be aligned with the power reception device 404 due to a repulsive force between the magnetic elements 430 and 480 and the power reception device 404 including a magnetic element having the same polarity as the first polarity.

Referring to case (b) of FIG. 4, a power transmission device 401 (for example, the electronic device 101 of FIG. 1 or the power transmission device 301 of FIG. 3) may include a first magnetic element 440 which can be rotated to have a first polarity or a second polarity in a first direction. For example, a wireless charging coil 411 included in the power transmission device 401 may be disposed in an annular shape without a central portion thereof like a donut, and the rotatable first magnetic element 440 may be positioned in the central portion where the wireless charging coil 411 does not exist. The rotatable first magnetic element 440 may include a shielding member 445 in the surroundings thereof so as not to affect a magnetic force of the wireless charging coil 411. In this case, the shielding member 445 may include a hole so that the first magnetic element 440 may transfer a magnetic force to a Hall sensor 450 adjacent to the first magnetic element 440. According to an embodiment, at least a part of the shielding member 445 may be positioned in a second direction of the first magnetic element 440 and/or the wireless charging coil 411. The shielding member 445 may prevent at least a part of a magnetic force generated by a coil and/or a magnet from being affected in the second direction.

According to an embodiment, the Hall sensor 450 may be positioned between the first magnetic element 440 and the shielding member 445.

According to an embodiment, the Hall sensor 450 may be positioned in the second direction of the shielding member 445. The shielding member 445 may be positioned between the first magnetic element 440 and the Hall sensor 450. The shielding member 445 may include a hole so that the first magnetic element 440 may transfer a magnetic force to the Hall sensor 450 adjacent to the first magnetic element 440.

According to various embodiments, the shielding member 445 may be implemented in a form which surrounds the first magnetic element 440. Although, in case (b) of FIG. 4, the shielding member 445 is shown to be extended up to an area between the wireless charging coil 411 and the Hall sensor 450 such that the Hall sensor 450 is not affected by the wireless charging coil 411, the technical idea of the disclosure may not be limited thereto. For example, the shielding member 445 may be implemented in a form which surrounds only the first magnetic element 440.

For example, the power transmission device 401 may be positioned in parallel with a power reception device 402 by using the first magnetic element 440 for alignment. For example, the first direction may refer to a direction facing the power reception device 402 when the power transmission device 401 wirelessly transmits power. That is, the first magnetic element 440 may rotate so as to have a polarity different from that of a second magnetic element 490 of the power reception device 402 in the first direction. For example, a wireless charging coil 421 included in the power reception device 402 may be disposed in an annular shape without a central portion thereof like a donut, and the second magnetic element 490 may be positioned in the central portion where the wireless charging coil 421 does not exist. The second magnetic element 490 may include a shielding member 495 in the surroundings thereof so as not to affect a magnetic force of the wireless charging coil 421. According to an embodiment, the shielding member 495 may be positioned in the first direction of the wireless charging coil 421 and/or the second magnetic element 490.

According to various embodiments, when the power reception device 402 is in contact with the power transmission device 401, the power transmission device 401 may be disposed such that a polarity of the first magnetic element 440 of the power transmission device 401 is aligned according to a polarity of the second magnetic element 490 of the power reception device 402. When the second magnetic element 490 has the first polarity, the first magnetic element 440 may rotate in the first direction to have the second polarity opposite to the first polarity. Alternatively, when the second magnetic element 490 has the second polarity, the first magnetic element 440 may rotate in the first direction to have the first polarity opposite to the second polarity.

Accordingly, the power transmission device 401 may be disposed to be aligned with the power reception device 402 even when the power reception device 402 includes a magnetic element having any polarity, and thus wirelessly transmit power. However, when power transmission schemes of the power transmission device 401 and the power reception device 402 are different, power transmission between the two devices may not be possible, or power transmission efficiency may decrease even when the power transmission device 401 transmits power to the power reception device 402.

According to various embodiments, the power reception device 402 may include a magnetic element having a different polarity for each manufacturer. In addition, the power reception device 402 may use a different power transmission scheme for each manufacturer (for example, a frequency of a signal for power transmission and/or a wireless power transmission communication protocol). In this case, the power transmission device 401 may identify a power transmission scheme of the power reception device 402, based on a polarity of the magnetic element 490 included in the power reception device 402. In this regard, hereinafter, a method of identifying a power transmission scheme of the power reception device 402 by the power transmission device 401 will be described in detail.

The operations of the power transmission device 401 described below may be performed by a processor (the processor 120 of FIG. 1) or a control circuit (for example, the control circuit 312 of FIG. 3) included in the power transmission device 401. However, for convenience of description, it will be assumed that a subject of the operations is the power transmission device 401.

Figure 5:
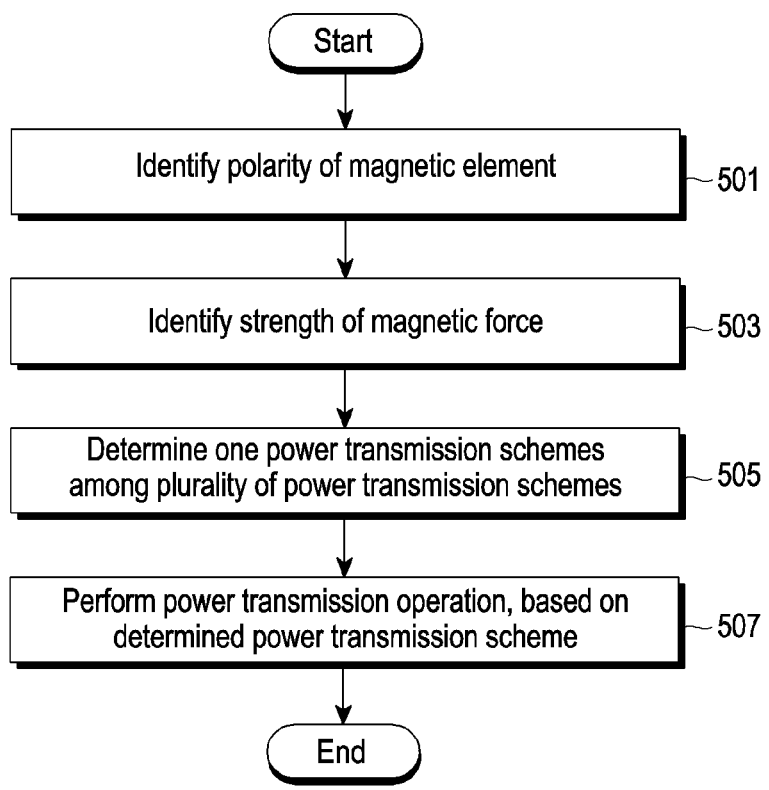
FIG. 5 is a flowchart illustrating an operation of a power transmission device according to various embodiments.

FIG. 5 is a flowchart illustrating an operation of a power transmission device according to various embodiments.

Referring to FIG. 5, according to various embodiments, in operation 501, the power transmitter 401 identifies a polarity of the first magnetic element 440 and/or the second magnetic element 490 due to approach of an external electronic device (e.g., the power reception device 402 of FIG. 3). For example, a first polarity of the first magnetic element 440 may be aligned in a first direction by a magnetic force generated when the second magnetic element 490 included in the external electronic device 402 approaches the first magnetic element 440. The power transmission device 401 may identify a change in a magnetic force as the first polarity of the first magnetic element 440 is aligned in the first direction, and identify the polarity of the first magnetic element 440 in response to the change in the magnetic force. For example, the first polarity of the first magnetic element 440 in the first direction may be opposite to a polarity of the second magnetic element 490. On the other hand, a second polarity of the first magnetic element 440 in a second direction opposite to the first direction may be the same as the polarity of the second magnetic element 490.

According to various embodiments, the power transmission device 401 may identify the second polarity of the first magnetic element 440 in the second direction in a state in which the first polarity of the first magnetic element 440 is aligned in the first direction, through a sensor (for example, a Hall sensor or a magnetic force sensor). The power transmission device 401 may identify the polarity of the second magnetic element 490, based on the second polarity of the first magnetic element 440 in the second direction. For example, the sensor (for example, a Hall sensor or a magnetic force sensor) may be positioned in the second direction of the first magnetic element 440, but may not be limited thereto.

According to various embodiments, the power transmission device 401 may detect a change in magnetic flux through the sensor (for example, a Hall sensor or a magnetic force sensor) when the external electronic device 402 approaches the power transmission device 401, and identify the polarity of the second magnetic element 490 included in the external electronic device 402, based on the detected state (or change) of the magnetic flux. For example, the power transmission device 401 may identify the polarity of the first magnetic element 440 and/or the second magnetic element 490, based on a direction of the magnetic flux. For example, the power transmission device 401 may identify a strength of a magnetic force, based on the density of magnetic flux (or the number of magnetic flux lines).

According to various embodiments, in operation 503, the power transmission device 401 identifies a strength of a magnetic force. For example, the power transmission device 401 may detect magnetic flux through the sensor (for example, a Hall sensor or a magnetic force sensor). The power transmission device 401 may identify the strength of the magnetic force, based on the magnetic flux detected through the sensor. For example, the power transmission device 401 may compare the strength of the magnetic force with a threshold value. For example, the power transmission device 401 may compare the strength of the magnetic force with the threshold value to identify whether the first magnetic element 440 is completely rotated to an "N pole" or an "S pole". The power transmission device 401 may identify whether the rotatable first magnetic element 440 malfunctions, through the operation of comparing the strength of the magnetic force with the threshold value.

According to an embodiment, the sensor of the power transmission device 401 may identify that the power reception device 402 is located in the vicinity of the power transmission device 401, based on the detected strength of the magnetic force. For example, when the power reception device 402 is more than a predetermined distance away from the power transmission device 401, the sensor may detect a first magnetic force strength, and when the power reception device 402 is located in the vicinity of the power transmission device 401, the sensor may detect a second magnetic force strength. For example, the second magnetic force strength may be greater than the first magnetic force strength. The power transmission device 401 may be aware that the power reception device 402 is located in the vicinity of the power transmission device 401, based on the magnetic force strength.

According to various embodiments, in operation 505, the power transmission device 401 determines one power transmission scheme among a plurality of power transmission schemes, based on the polarity of the magnetic element and the strength of the magnetic force. For example, each of the plurality of power transmission schemes may have a different frequency band of a signal for power transmission. In addition, each of the plurality of power transmission schemes may have a different resonant frequency of a signal for power transmission.

According to various embodiments, the configuration of operation 503 may be omitted. For example, the power transmission device 401 may determine one power transmission scheme among the plurality of power transmission schemes, based on the polarity of the magnetic element without measuring the strength of the magnetic force.

According to various embodiments, in operation 507, the power transmission device 401 wirelessly transmits power to the external electronic device 402, based on the determined power transmission scheme. For example, the power transmission device 401 may output a ping signal and a signal for power transmission, based on a frequency band and a resonant frequency corresponding to the determined power transmission scheme.

Figure 6:
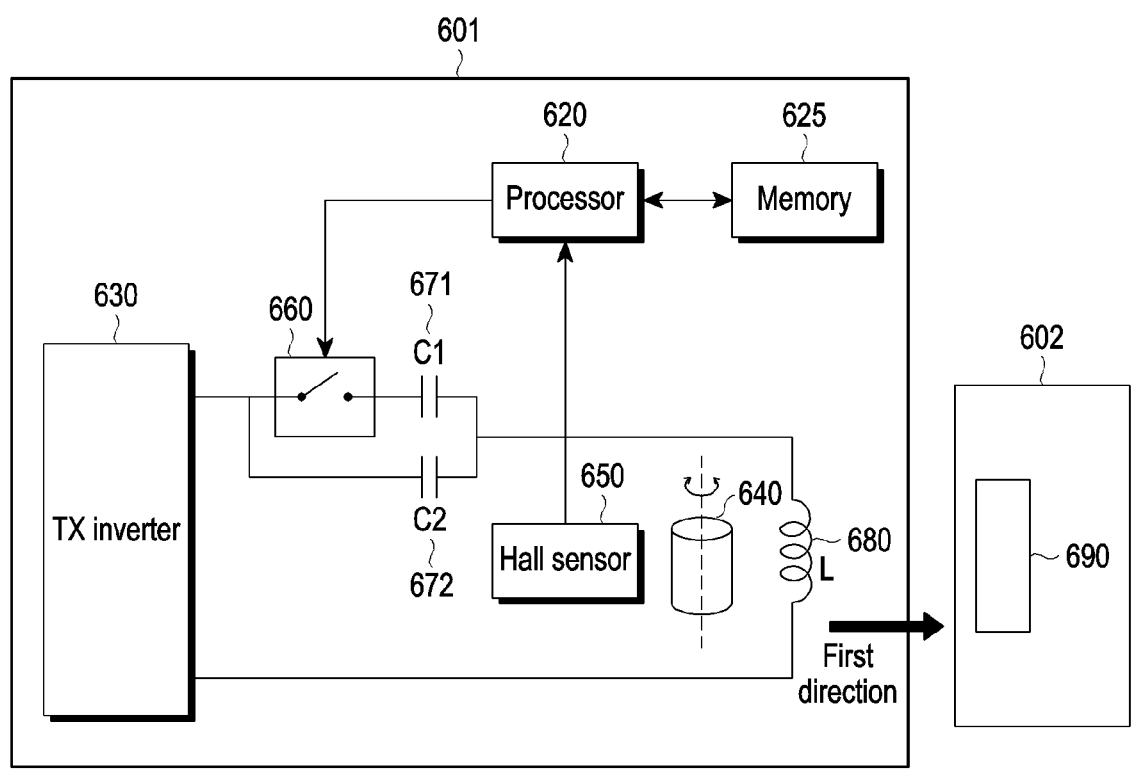
FIG. 6 is a block diagram of a power transmission device according to various embodiments.

FIG. 6 is a block diagram of a power transmission device according to various embodiments.

Referring to FIG. 6, a power transmission device 601 may include a processor 620, a memory 625, an inverter 630, a first magnetic element 640, a Hall sensor 650, a switch 660, a first capacitor 671, a second capacitor 672, and a coil 680. For example, the power transmission device 601 may be implemented to be identical or similar to the electronic device 101 of FIG. 1 or the power transmission device 301 of FIG. 3.

According to various embodiments, the first magnetic element 640 may rotate to have a polarity of an "N pole" or an "S pole" in a first direction. For example, the first magnetic element 640 may have an "N pole" on one surface thereof and have an "S pole" on the other surface thereof. For example, the first direction may be a direction toward a power reception device 602.

According to various embodiments, the power reception device 602 may include a second magnetic element 690. The second magnetic element 690 may have the polarity of the "N pole" or the "S pole". For example, the second magnetic element 690 may have one polarity of the "N pole" and "S pole". In addition, the second magnetic element 690 may be disposed to be fixed at a specific position of the power reception device 602.

According to an embodiment, the expression of having one polarity may mean a magnet which performs only a role corresponding to a single pole in the embodiment disclosed herein. A single-pole magnet may be implemented in the following form. For example, a magnet including the "N pole" and the "S pole" functions as a multi-pole magnet when placed along a surface of a housing (when placed parallel to the surface), but when the magnet including the "N pole" and the "S pole" is placed perpendicular to the surface of the housing, only a pole adjacent to the surface may function to generate a magnetic force (e.g., an attractive force) in relation to the power transmission device 601. In this case, a magnet having a polarity disposed perpendicular to the housing may be referred to as a single-pole magnet for convenience of description/distinction.

For another example, a magnet having one polarity may be implemented as a magnet which physically includes two poles, but substantially has the one polarity which is overwhelmingly dominant. For example, a magnet composite such as a Halbach array may function as a single-pole magnet.

For another example, a magnet having one polarity may be implemented as a magnet with an appropriate shape/arrangement (e.g., a pot type and a ring type) manufactured in consideration of a situation in which only single-pole magnetism is required.

Although it is illustrated herein that the second magnetic element 690 may have one polarity of the "N pole" and the "S pole", this is merely exemplary, and the number of polarities is not limited. For example, each of the first magnetic element 640 and the second magnetic element 690 may include both the "N pole" and the "S pole". In this case, the "N poles" and the "S poles" of the first magnetic element 640 and the second magnetic element 690 may be arranged to cross each other. For another example, a plurality of first magnetic elements 640 and a plurality of second magnetic elements 690 may be disposed.

According to various embodiments, the processor 620 may control the overall operation of the power transmission device 601. For example, the processor 620 may be implemented to be identical or similar to the processor 120 of FIG. 1 or the control circuit 312 of FIG. 3.

According to various embodiments, when the first magnetic element 640 is aligned in a first direction by a magnetic force generated as the power reception device 602 approaches the power transmission device 601 (or the power transmission device 601 approaches the power reception device 602), the processor 620 may identify a polarity of the first magnetic element 640 corresponding to the magnetic force through the Hall sensor 650. For example, the processor 620 may identify a polarity of the first magnetic element 640 in a second direction. For example, the second direction may be a direction opposite to the first direction.

According to various embodiments, the processor 620 may identify a strength of a magnetic force through the Hall sensor 650. The processor 620 may identify a magnetic flux state or change through the Hall sensor 650. For example, the processor 620 may compare a threshold value stored in the memory 625 with the strength of the magnetic force.

According to various embodiments, the processor 620 may determine one power transmission scheme among a plurality of power transmission schemes, based on a polarity and a strength of a magnetic force. For example, each of the plurality of power transmission schemes may be a wireless power transmission scheme supported by the power transmission device 601. In each of the plurality of power transmission schemes, a ping signal, a data transfer scheme (for example, a packet format for charging configuration), and a power transmission signal have frequency bands and resonant frequencies.

According to various embodiments, the processor 620 may output a signal for controlling the switch 660 to the switch 660 in order to determine a frequency corresponding to a power transmission scheme. The processor 620 may control the switch 660 to determine resonant frequencies of a power transmission signal and a ping signal. For example, when the switch 660 is short-circuited, the resonant frequency may be determined based on capacitance C1+C2 of the first capacitor 671 and the second capacitor 672. On the other hand, when the switch 660 is opened, the resonant frequency may be determined based on capacitance C2 of the second capacitor 672.

According to various embodiments, although it is illustrated in FIG. 6 that the switch 660 functions to determine capacitance as C2 or C1+C2, the technical idea of the disclosure may not be limited thereto. For example, the switch 660 may function to connect a path including the first capacitor or the second capacitor 672 to a branch point of the TX inverter 630. In this case, the capacitance may be determined as C1 or C2 by the switch 660. In addition, the resonant frequency may be determined based on capacitance C1 or C2.

According to various embodiments, the processor 620 may wirelessly transmit power to the power reception device 602, based on the determined power transmission scheme. For example, the processor 620 may output a ping signal and a power transmission signal, based on the determined power transmission scheme. For example, when the polarity of the first magnetic element 640 in the second direction corresponds to a first pole (for example, an N pole), the processor 620 may transmit power, based on a first power transmission scheme among the plurality of power transmission schemes. Alternatively, when the polarity of the first magnetic element 640 in the second direction corresponds to a second pole (for example, an S pole), the processor 620 may transmit power, based on a second power transmission scheme among the plurality of power transmission schemes. For example, the first power transmission scheme may be different from the second power transmission scheme. For example, a resonant frequency of the first power transmission scheme may be determined based on the capacitance C1+C2, and a resonant frequency of the second power transmission scheme may be determined based on the capacitance C2. For example, the resonant frequency of the second power transmission scheme may be greater than the resonant frequency of the first power transmission scheme. For example, a frequency band of the first power transmission scheme may be 100 to 140 kHz, and a frequency band of the second power transmission scheme may be 250 to 320 kHz.

Figure 7A:
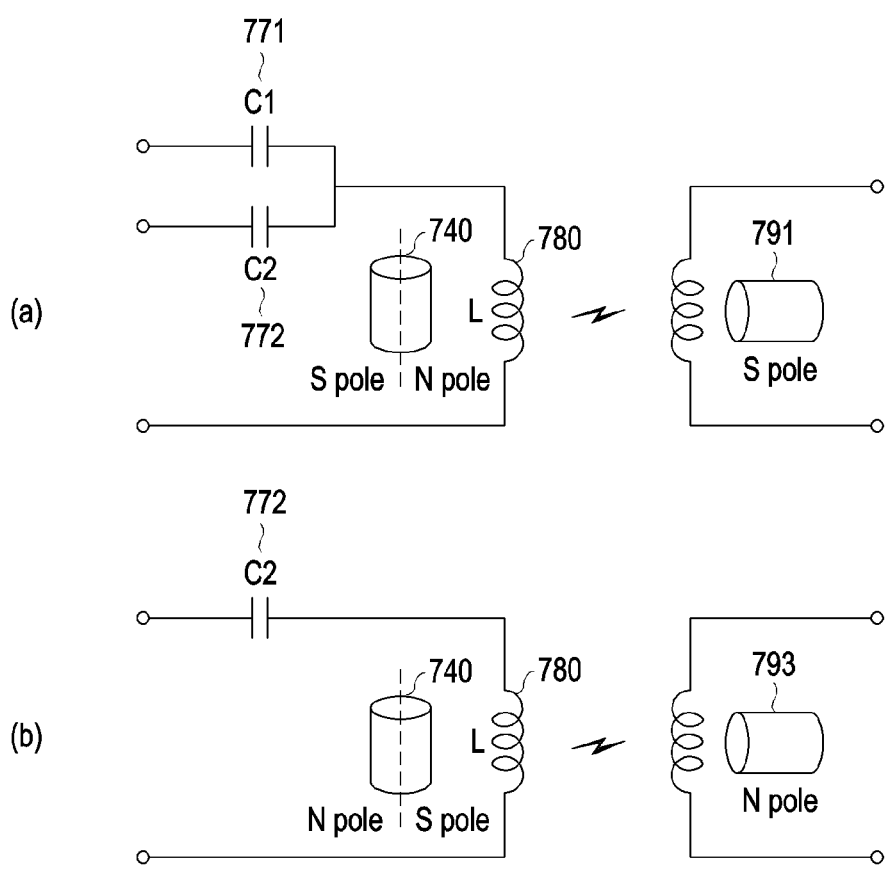
FIGS. 7A and 7B are diagrams illustrating a wireless charging system according to various embodiments.
Figure 7B:
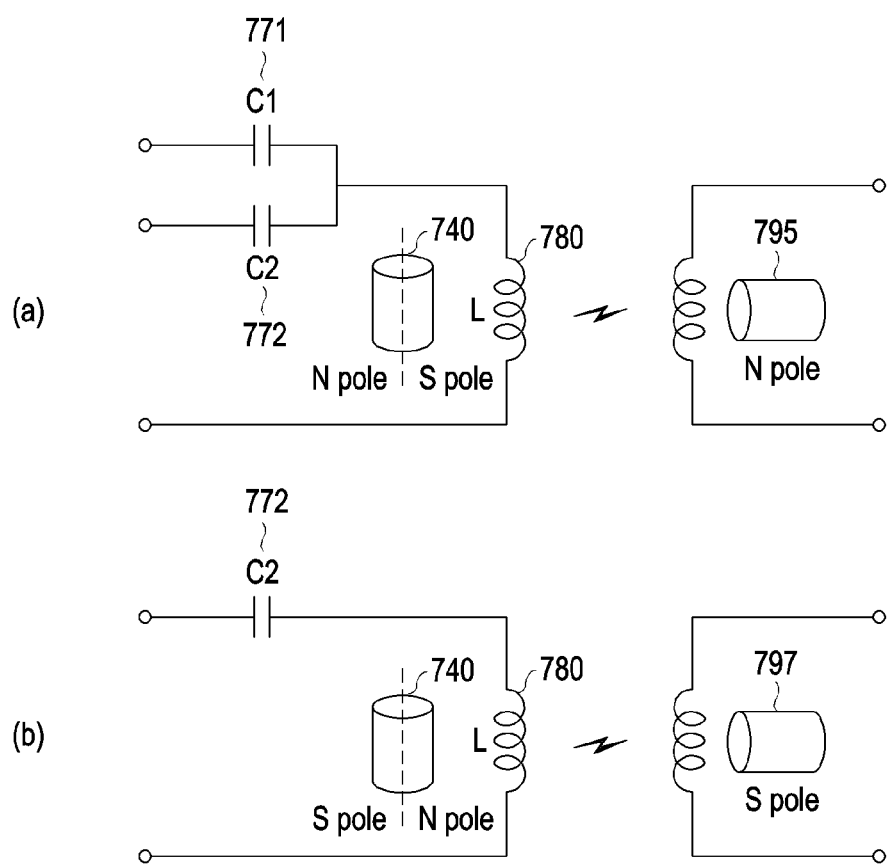

FIGS. 7A and 7B are diagrams illustrating a wireless charging system according to various embodiments.

Referring to FIG. 7A, the power transmission device 601 may determine a power transmission scheme according to a polarity of a second magnetic element of the power reception device 602.

According to various embodiments, as shown in case (a) of FIG. 7A, when a polarity of a second magnetic element 791 is an "S pole", the power transmission device 601 may transmit power, based on a first power transmission scheme among a plurality of power transmission schemes. For example, a resonant frequency of the first power transmission scheme may be determined based on capacitance C1+C2 of a first capacitor 771 and a second capacitor 772 and an inductance L of a coil 780. The power transmission device 601 may use a first communication protocol corresponding to the first power transmission scheme. Alternatively, as shown in case (b) of FIG. 7A, when a polarity of a second magnetic element 793 is an "N pole", the power transmission device 601 may transmit power, based on a second power transmission scheme among the plurality of power transmission schemes. For example, a resonant frequency of the second power transmission scheme may be determined based on capacitance C2 of the second capacitor 772 and the inductance L of the coil 780. The power transmission device 601 may use a second communication protocol corresponding to the second power transmission scheme.

According to various embodiments, as shown in case (a) of FIG. 7B, when a polarity of a second magnetic element 795 is an "N pole", the power transmission device 601 may transmit power, based on a first power transmission scheme among a plurality of power transmission schemes. For example, a resonant frequency of the first power transmission scheme may be determined based on the capacitance C1+C2 of the first capacitor 771 and the second capacitor 772 and the inductance L of the coil 780. Alternatively, as shown in case (b) of FIG. 7B, when a polarity of a second magnetic element 797 is an "S pole", the power transmission device 601 may transmit power, based on a second power transmission scheme among the plurality of power transmission schemes. For example, a resonant frequency of the second power transmission scheme may be determined based on the capacitance C2 of the second capacitor 772 and the inductance L of the coil 780.

Although only two capacitors are illustrated in FIGS. 7A and 7B for convenience of description, the number of capacitors may not be limited thereto.

Figure 8:
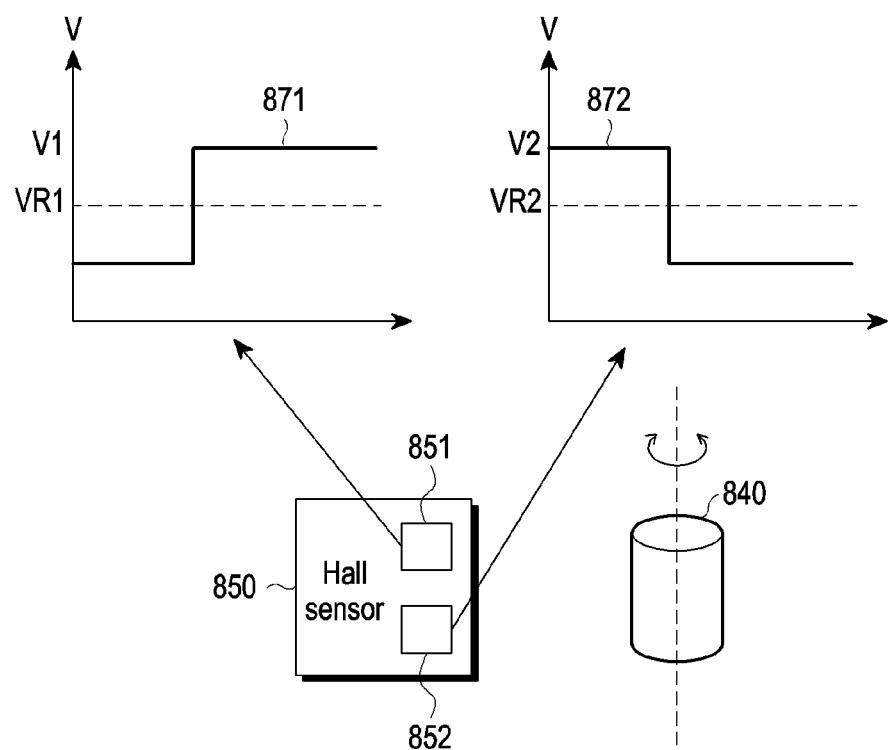
FIG. 8 is a diagram illustrating an operation of determining a power transmission scheme through a sensor by a power transmission device according to various embodiments.

FIG. 8 is a diagram illustrating an operation of determining a power transmission scheme through a sensor by a power transmission device according to various embodiments.

Referring to FIG. 8, according to various embodiments, the processor 620 (for example, the processor 620 of FIG. 6) may identify a polarity of a first magnetic element 840 (for example, the first magnetic element 640 of FIG. 6) through a Hall sensor 850 (e.g., the Hall sensor 650 of FIG. 6). For example, the Hall sensor 850 (for example, the Hall sensor 650 of FIG. 6) may include a first sensor module 851 and a second sensor module 852. For example, the first sensor module 851 may be a sensor for detecting a first pole (for example, an N pole), and the second sensor module 852 may be a sensor for detecting a second pole (for example, an S pole).

Although FIG. 8 illustrates the first sensor module 851 and the second sensor module 852 separately, the first sensor module 851 and the second sensor module 852 may be implemented as one sensor.

According to various embodiments, the processor 620 may identify whether a polarity of the first magnetic element 840 toward the Hall sensor 850 corresponds to the first pole (for example, the N pole), through the first sensor module 851. The first sensor module 851 may output a voltage value 871, based on the polarity of the first magnetic element 840. For example, when the rotatable first magnetic element 840 completely faces the first pole (for example, the N pole) with reference to the Hall sensor 850, the first sensor module 851 may output a voltage value "V1" corresponding to a high level. For example, the voltage value "V1" may be greater than "VR1" indicating a first threshold value. On the other hand, when the rotatable first magnetic element 840 does not completely face the first pole (for example, the N pole) with reference to the Hall sensor 850, the first sensor module 851 may output a voltage value lower than "VR1".

According to various embodiments, the processor 620 may identify whether the polarity of the first magnetic element 840 toward the Hall sensor 850 corresponds to the second pole (for example, the S pole), through the second sensor module 852. The second sensor module 852 may output a voltage value 872, based on the polarity of the first magnetic element 840. When the rotatable first magnetic element 840 completely faces the second pole (for example, the S pole) with reference to the Hall sensor 850, the second sensor module 852 may output a voltage value "V2" corresponding to a high level. For example, the voltage value "V2" may be greater than "VR2" indicating a second threshold value. On the other hand, when the rotatable first magnetic element 840 does not completely face the second pole (for example, the S pole) with reference to the Hall sensor 850, the second sensor module 852 may output a voltage value lower than "VR2".

According to various embodiments, the processor 620 may identify the polarity of the first magnetic element 840 and a strength of a magnetic force through the Hall sensor 850.

Figure 9:
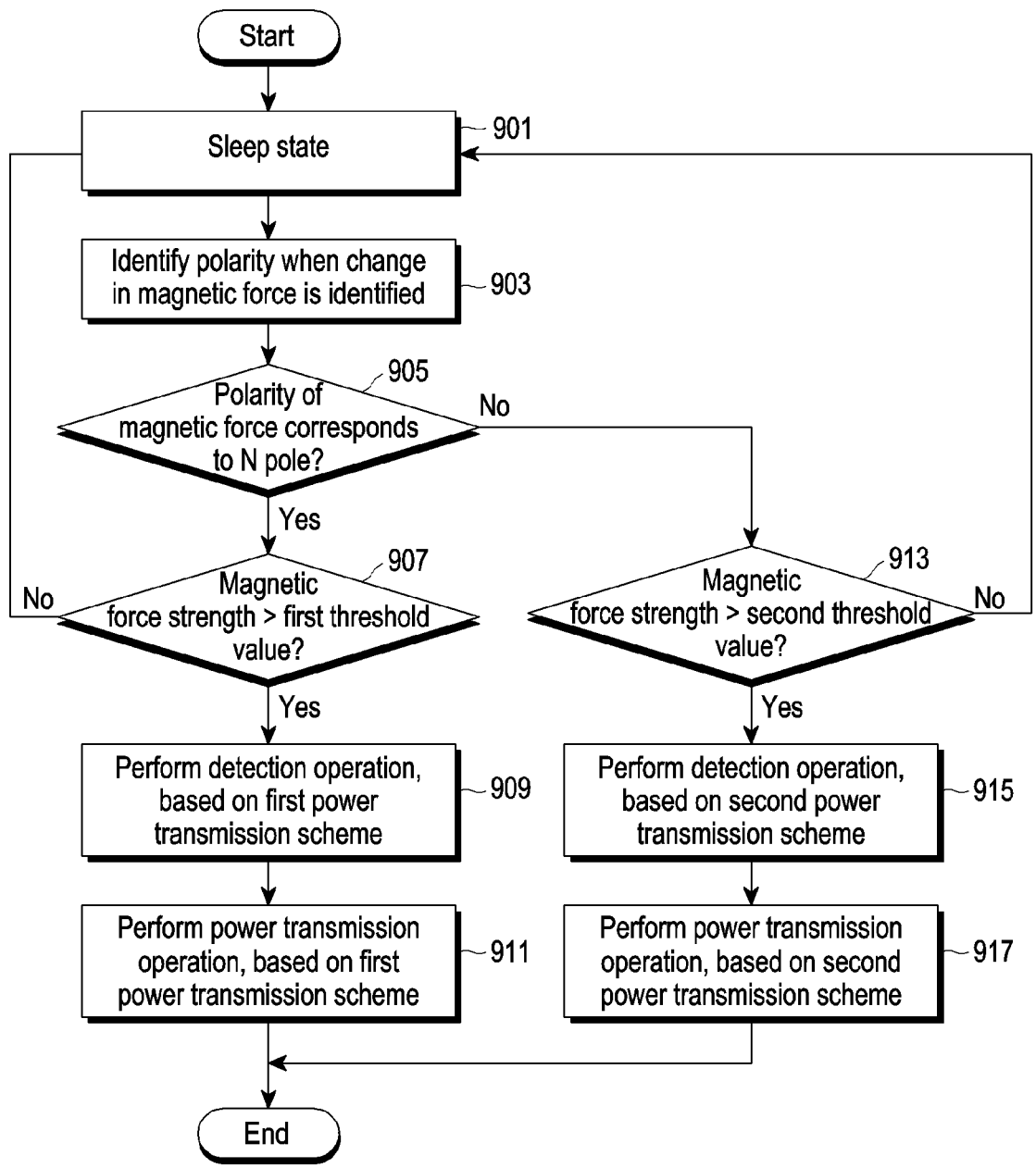
FIG. 9 is a flowchart illustrating an operation of a power transmission device according to various embodiments.

FIG. 9 is a flowchart illustrating an operation of a power transmission device according to various embodiments.

Referring to FIG. 9, according to various embodiments, in operation 901, the power transmission device 601 (for example, the power transmission device of FIG. 6) may be in a sleep state. For example, the sleep state may refer to a state in which a ping signal and/or a signal for power transmission is not output to the power reception device 602 (for example, the power reception device of FIG. 6).

According to various embodiments, in operation 903, when a change in a magnetic force (for example, a change in a magnetic force strength according to a polarity change or a change in a magnetic force strength without a polarity change) is identified, the power transmission device 601 may identify a polarity of the first magnetic element 640 (for example, the first magnetic element of FIG. 6), through the Hall sensor 650 (for example, the Hall sensor of FIG. 6). For example, when a change in a magnetic force is identified, the power transmission device 601 may switch from the sleep state to a wakeup state (or an active state). For example, the wakeup state (or active state) may be a state in which an operation for power transmission may be performed. In operation 905, the power transmission device 601 may identify whether the polarity of the first magnetic element 640 is an "N pole".

According to various embodiments, operation 901 may be omitted. For example, when the power transmission device 601 is not in the sleep state, operation 903 may be directly performed. In this case, the power transmission device 601 may omit the operation of switching into the wakeup state (active state). In addition, the power transmission device 601 may identify the polarity of the first magnetic element 640 even when the change in the magnetic force is not identified.

According to various embodiments, when the polarity of the first magnetic element 640 is the "N pole" (Yes in operation 905), in operation 907, the power transmission device 601 may identify whether a magnetic force strength exceeds a first threshold value. For example, the first threshold value may refer to a magnetic force strength when the rotatable first magnetic element 640 faces the "N pole" by a predetermined angle or more with reference to the Hall sensor 650.

According to various embodiments, when the magnetic force strength does not exceed the first threshold value (No in operation 907), the power transmission device 601 may enter the sleep state again without performing an operation for transmitting power.

According to various embodiments, when the magnetic force strength exceeds the first threshold value (Yes in operation 907), in operation 909, the power transmission device 601 may perform an operation of detecting the power reception device 602, based on a first power transmission scheme. For example, the power transmission device 601 may output a ping signal having a resonant frequency corresponding to the first power transmission scheme at a preconfigured period. For example, when a specific packet corresponding to the ping signal is received, the power transmission device 601 may perform an operation for power transmission. On the other hand, when the specific packet corresponding to the ping signal is not received, the power transmission device 601 may enter the sleep state again without performing the operation for power transmission.

According to various embodiments, in operation 911, the power transmission device 601 may perform an operation of transmitting power to the power reception device 602, based on the first power transmission scheme. For example, the power transmission device 601 may transmit, to the power reception device 602, a power transmission signal having a resonant frequency corresponding to the first power transmission scheme. For example, when the specific packet is not received for a predetermined time, the power transmission device 601 may stop transmission of the power transmission signal and enter the sleep state again. Alternatively, when a packet indicating the completion of charging is received, the power transmission device 601 may stop transmission of the power transmission signal and enter the sleep state again.

According to various embodiments, when the polarity of the first magnetic element 640 is not the "N pole" (No in operation 905), in operation 913, the power transmission device 601 may identify whether a magnetic force strength exceeds a second threshold value. For example, the second threshold value may refer to a magnetic force strength when the rotatable first magnetic element 640 faces an "S pole" by a predetermined angle or more with reference to the Hall sensor 650. In this case, the second threshold value may be the same as or different from the first threshold value.

According to various embodiments, when the magnetic force strength does not exceed the second threshold value (No in operation 913), the power transmission device 601 may enter the sleep state again without performing an operation for transmitting power.

According to various embodiments, when the magnetic force strength exceeds the second threshold value (Yes in operation 913), in operation 915, the power transmission device 601 may perform an operation of detecting the power reception device 602, based on a second power transmission scheme. For example, the power transmission device 601 may output a ping signal having a resonant frequency corresponding to the second power transmission scheme at a preconfigured period. For example, when a specific packet corresponding to the ping signal is received, the power transmission device 601 may perform an operation for power transmission. On the other hand, when the specific packet corresponding to the ping signal is not received, the power transmission device 601 may enter the sleep state again without performing the operation for power transmission.

According to various embodiments, in operation 917, the power transmission device 601 may perform an operation of transmitting power to the power reception device 602, based on the second power transmission scheme. For example, the power transmission device 601 may transmit, to the power reception device 602, a power transmission signal having a resonant frequency corresponding to the second power transmission scheme. For example, when the specific packet is not received for a predetermined time, the power transmission device 601 may stop transmission of the power transmission signal and enter the sleep state again. Alternatively, when a packet indicating the completion of charging is received, the power transmission device 601 may stop transmission of the power transmission signal and enter the sleep state again.

Figure 10:
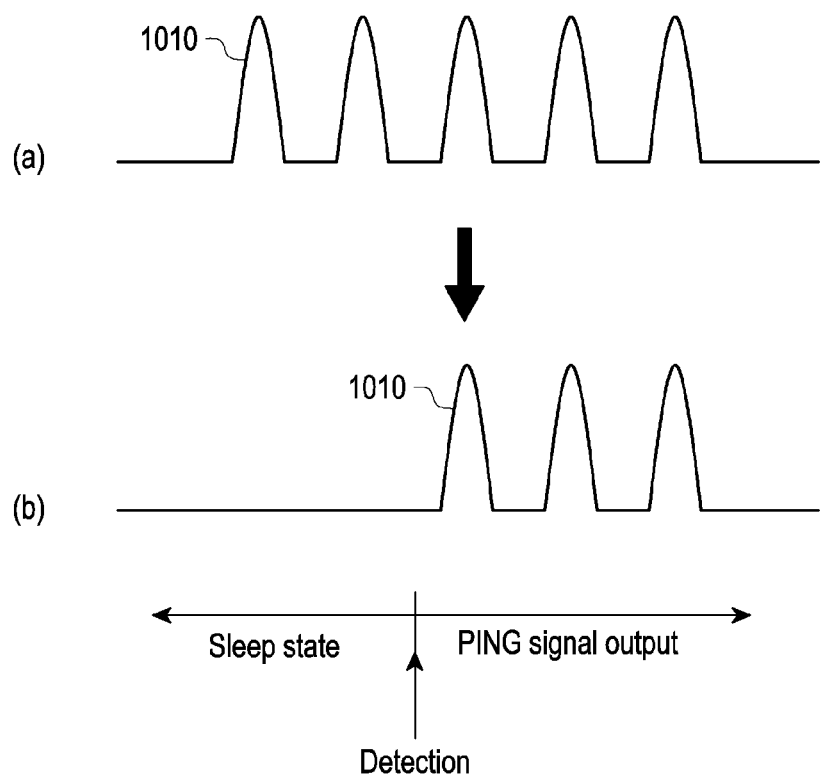
FIG. 10 is a diagram illustrating an operation of outputting a ping signal by a power transmission device according to various embodiments.

FIG. 10 is a diagram illustrating an operation of outputting a ping signal by a power transmission device according to various embodiments.

Referring to FIG. 10, as shown in case (a) of FIG. 10, a power transmission device according to a comparative embodiment may output a ping signal 1010 in order to detect a power reception device. For example, the power transmission device according to the comparative embodiment may output the ping signal 1010 at a preconfigured period, based on a specific power transmission scheme. In this case, the power transmission device according to the comparative embodiment may output the ping signal 1010 until the power reception device is detected.

According to various embodiments, as shown in case (b) of FIG. 10, the power transmission device 601 (for example, the power transmission device of FIG. 6) may not output the ping signal 1010 in a sleep state. The power transmission device 601 may output the ping signal 1010 at a preconfigured period, based on an operation (for example, a detection time point) of identifying a change in a magnetic force of the first magnetic element 640 (for example, the first magnetic element of FIG. 6). In this case, when the change in the magnetic force is identified, the power transmission device 601 may identify a polarity of the first magnetic element 640, through the Hall sensor 650 (for example, the Hall sensor of FIG. 6), and output the ping signal 1010, based on a power transmission scheme corresponding to the identified polarity. Accordingly, the power transmission device 601 can reduce power consumption when compared to case (a) of FIG. 10.

Figure 11:
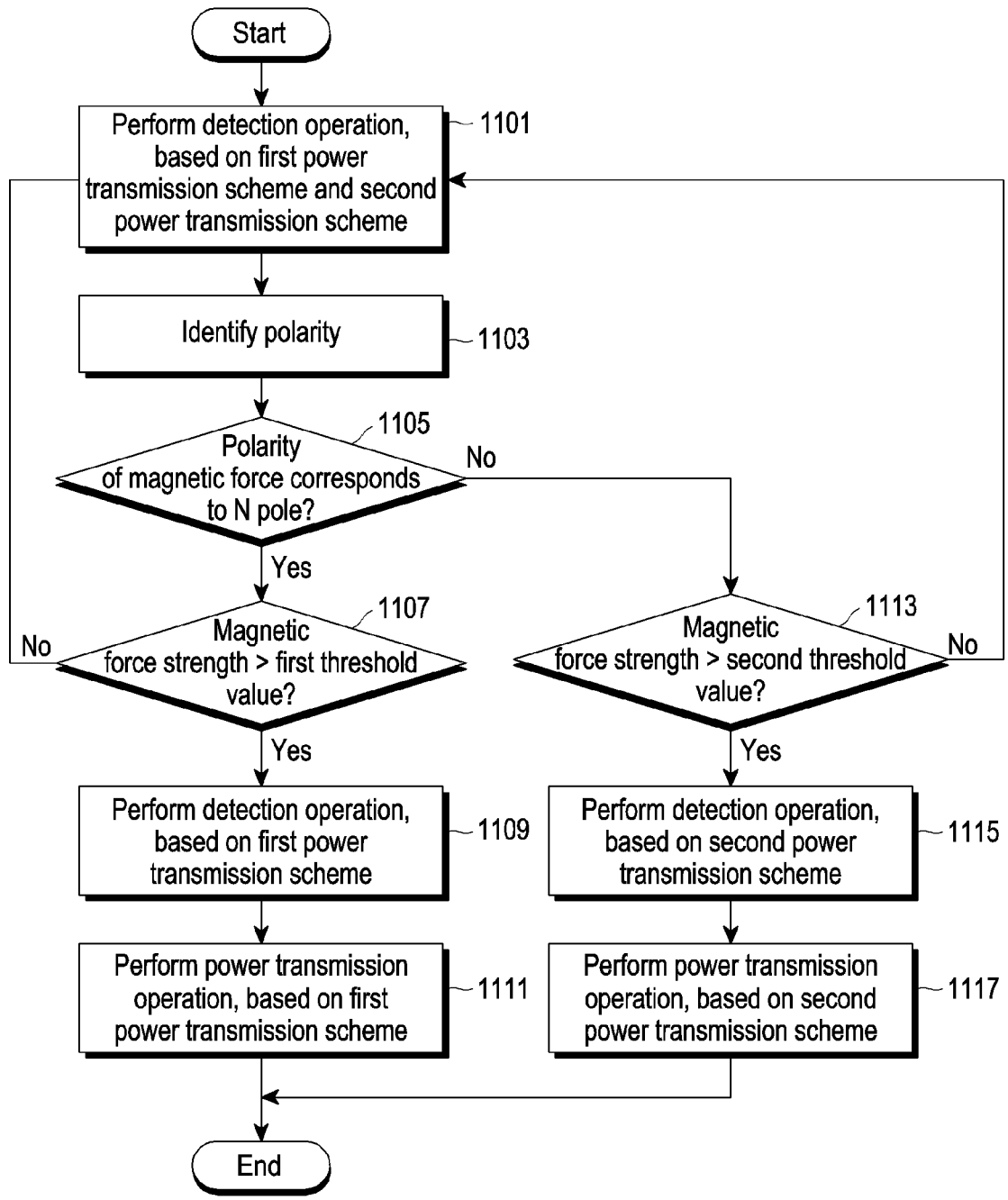
FIG. 11 is a flowchart illustrating an operation of a power transmission device according to various embodiments.

FIG. 11 is a flowchart illustrating an operation of a power transmission device according to various embodiments.

Referring to FIG. 11, according to various embodiments, in operation 1101, the power transmission device 601 (for example, the power transmission device of FIG. 6) may output a first ping signal, based on a first power transmission scheme, according to a preconfigured period, and output a second ping signal, based on a second power transmission scheme. For example, the power transmission device 601 may alternately output a first ping signal of a first resonant frequency and a second ping signal of a second resonant frequency according to a preconfigured period. The power transmission device 601 may sequentially output the first ping signal and the second ping signal while turning on/off the switch 660 (for example, the switch of FIG. 6). According to an embodiment, the power transmission device 601 may output the first ping signal for a first designated time, and output the second ping signal for a second designated time. Alternatively, the power transmission device 601 may alternately output the first ping signal and the second ping signal within one time interval. For example, the power transmission device 601 may detect a power reception device using the first power transmission scheme and/or a power reception device using the second power transmission scheme by alternately outputting the first ping signal and the second ping signal. That is, the power transmission device 601 may detect all the power reception devices using different power transmission schemes.

According to various embodiments, in operation 1103, the power transmission device 601 may identify a polarity of the first magnetic element 640 (for example, the first magnetic element of FIG. 6) through the Hall sensor 650 (for example, the Hall sensor of FIG. 6). For example, when a change in a magnetic force is identified, the power transmission device 601 may identify the polarity of the first magnetic element 640 (for example, the first magnetic element of FIG. 6) through the Hall sensor 650. Alternatively, the power transmission device 601 may also identify the polarity of the first magnetic element 640 (for example, the first magnetic element of FIG. 6), through the Hall sensor 650, without identifying a change in a magnetic force. For example, in operation 1105, the power transmission device 601 may identify whether the polarity of the first magnetic element 640 is an "N pole".

According to various embodiments, when the polarity of the first magnetic element 640 is the "N pole" (Yes in operation 1105), in operation 1107, the power transmission device 601 may identify whether a magnetic force strength exceeds a first threshold value. For example, the first threshold value may refer to a magnetic force strength in a state in which the rotatable first magnetic element 640 is completely the "N pole" with reference to the Hall sensor 650.

According to various embodiments, when the magnetic force strength does not exceed the first threshold value (No in operation 1107), the power transmission device 601 may continuously output the first ping signal and the second ping signal without performing an operation for transmitting power.

According to various embodiments, when the magnetic force strength exceeds the first threshold value (Yes in operation 1107), in operation 1109, the power transmission device 601 may perform an operation of detecting the power reception device 602, based on the first power transmission scheme. For example, the power transmission device 601 may output a first ping signal having a resonant frequency corresponding to the first power transmission scheme at a preconfigured period. That is, the power transmission device 601 may output only the first ping signal. For example, when a specific packet corresponding to the first ping signal is received, the power transmission device 601 may perform an operation for power transmission. On the other hand, when the specific packet corresponding to the first ping signal is not received, the power transmission device 601 may output the first ping signal and the second ping signal again without performing the operation for power transmission.

According to various embodiments, in operation 1111, the power transmission device 601 may perform an operation of transmitting power to the power reception device 602, based on the first power transmission scheme. For example, the power transmission device 601 may transmit, to the power reception device 602, a power transmission signal having a resonant frequency corresponding to the first power transmission scheme. For example, when the specific packet is not received for a predetermined time, the power transmission device 601 may stop transmission of the power transmission signal and output the first ping signal and the second ping signal again. Alternatively, when a packet indicating the completion of charging is received, the power transmission device 601 may stop transmission of the power transmission signal and output the first ping signal and the second ping signal again.

According to various embodiments, when the polarity of the first magnetic element 640 is not the "N pole" (No in operation 1105), in operation 1113, the power transmission device 601 may identify whether a magnetic force strength exceeds a second threshold value. For example, the second threshold value may refer to a magnetic force strength in a state in which the rotatable first magnetic element 640 is completely an "S pole" with reference to the Hall sensor 650. In this case, the second threshold value may be the same as or different from the first threshold value.

According to various embodiments, when the magnetic force strength does not exceed the second threshold value (No in operation 1113), the power transmission device 601 may output the first ping signal and the second ping signal again without performing an operation for transmitting power.

According to various embodiments, when the magnetic force strength exceeds the second threshold value (Yes in operation 1113), in operation 1115, the power transmission device 601 may perform an operation of detecting the power reception device 602, based on the second power transmission scheme. For example, the power transmission device 601 may output a second ping signal having a resonant frequency corresponding to the second power transmission scheme at a preconfigured period. For example, when a specific packet corresponding to the second ping signal is received, the power transmission device 601 may perform an operation for power transmission. On the other hand, when the specific packet corresponding to the second ping signal is not received, the power transmission device 601 may output the first ping signal and the second ping signal again without performing the operation for power transmission.

According to various embodiments, in operation 1117, the power transmission device 601 may perform an operation of transmitting power to the power reception device 602, based on the second power transmission scheme. For example, the power transmission device 601 may transmit, to the power reception device 602, a power transmission signal having a resonant frequency corresponding to the second power transmission scheme. For example, when the specific packet is not received for a predetermined time, the power transmission device 601 may stop transmission of the power transmission signal and output the first ping signal and the second ping signal again. Alternatively, when a packet indicating the completion of charging is received, the power transmission device 601 may stop transmission of the power transmission signal and output the first ping signal and the second ping signal again.

Figure 12:
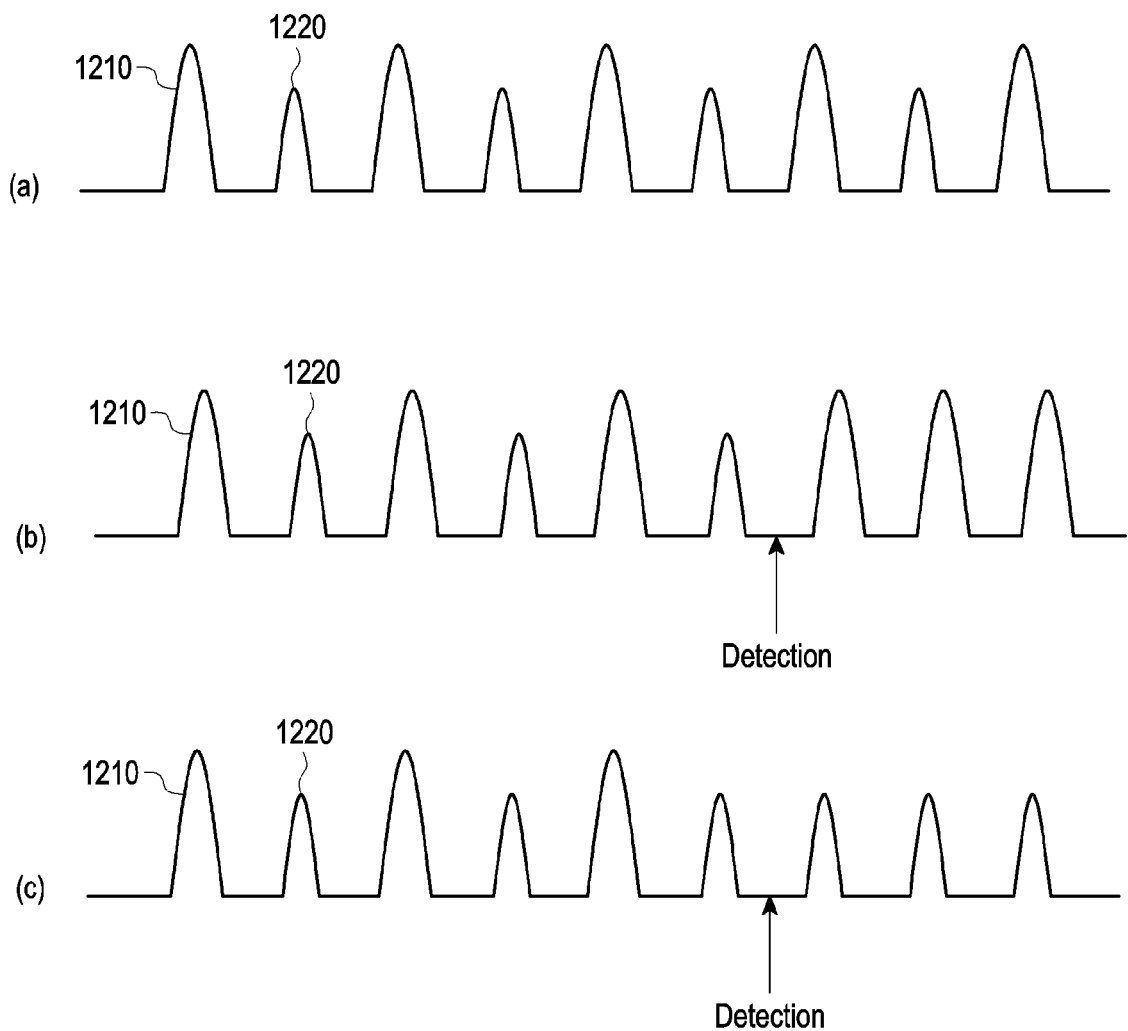
FIG. 12 is a diagram illustrating an operation of outputting ping signals by a power transmission device according to various embodiments.

FIG. 12 is a diagram illustrating an operation of outputting ping signals by a power transmission device according to various embodiments.

Referring to FIG. 12, as shown in case (a) of FIG. 12, a power transmission device (for example, the power transmission device of FIG. 6) may output a first ping signal 1210 of a first power transmission scheme and a second ping signal 1220 of a second power transmission scheme in order to detect a power reception device. For example, the power transmission device 601 may detect a power reception device using the first power transmission scheme and/or a power reception device using the second power transmission scheme by alternately outputting the first ping signal and the second ping signal. That is, the power transmission device 601 may alternately output the first ping signal and the second ping signal in order to detect all the power reception devices using different power transmission schemes.

According to various embodiments, as shown in cases (b) and (c) of FIG. 12, while alternately outputting the first ping signal and the second ping signal, the power transmission device 601 may output one of the first ping signal 1210 and the second ping signal 1220 at a preconfigured period, based on an operation (for example, a detection time point) of identifying a change in a magnetic force of the first magnetic element 640 (for example, the first magnetic element of FIG. 6). For example, when the change in the magnetic force is identified, the power transmission device 601 may identify a polarity of the first magnetic element 640, through the Hall sensor 650 (for example, the Hall sensor of FIG. 6), and output the first ping signal 1210 or the second ping signal 1220, based on a power transmission scheme corresponding to the identified polarity.

According to various embodiments, as shown in case (b) of FIG. 12, when the polarity of the first magnetic element 640 is identified as an "N pole", the power transmission device 601 may output the first ping signal 1210 according to a preconfigured period. For another example, as shown in case (c) of FIG. 12, when the polarity of the first magnetic element 640 is identified as an "S pole", the power transmission device 601 may output the second ping signal 1220 according to a preconfigured period.

According to various embodiments, as shown in case (b) of FIG. 12, when the polarity of the first magnetic element 640 is identified as the "S pole", the power transmission device 601 may output the first ping signal 1210 according to a preconfigured period. Alternatively, as shown in case (c) of FIG. 12, when the polarity of the first magnetic element 640 is identified as the "N pole", the power transmission device 601 may output the second ping signal 1220 according to a preconfigured period.

An electronic device according to various embodiments may include a sensor, a first magnetic element which can be rotated to have a polarity of a first pole or a second pole in a first direction, and a processor, wherein the processor is configured to, identify, based at least in part on the sensor, a polarity of a first magnetic element or a second magnetic element and a strength of a magnetic force generated by approaching of the second magnetic element to the first magnetic element, the polarity being determined by the magnetic force, the second magnetic element being included in an external electronic device, select a power transmission scheme from a plurality of power transmission schemes, based on the polarity and the strength of the magnetic force, and wirelessly transmit power to the external electronic device, based at least in part on the power transmission scheme.

The processor may be configured to determine a frequency of a ping signal and a frequency of a power transmission signal, based on the power transmission scheme.

The processor may be configured to output a signal for controlling a switch included in the electronic device, in order to determine the frequency of the ping signal and the frequency of the power transmission signal.

Each of the plurality of power transmission schemes may have different resonant frequencies of a ping signal and a power transmission signal.

The processor may be configured to, based on identifying that a polarity of the magnetic force corresponds to the first pole, perform an operation of transmitting the power, based on a first power transmission scheme, and based on identifying that the polarity of the magnetic force corresponds to the second pole, perform an operation of transmitting the power, based on a second power transmission scheme different from the first power transmission scheme.

The processor may be configured to, based on identifying the magnetic force when the electronic device is in a sleep state, change the sleep state to an active state.

The processor may be configured to compare the strength of the magnetic force with a threshold value and start an operation detecting the external electronic device based on a determination that the strength of the magnetic force is greater than the threshold value.

The processor may be configured to output a ping signal having a frequency determined based on the power transmission scheme.

The processor may be configured to, based on detecting the external electronic device, transmit a power transmission signal having a frequency determined based on the power transmission scheme to the external electronic device.

The processor may be configured to compare the strength of the magnetic force with a threshold value, and based on a determination that the strength of the magnetic force is less than or equal to the threshold value, change the active state to the sleep state.

An operating method of an electronic device including a first magnetic element which can be rotated to have a polarity of a first pole or a second pole in a first direction according to various embodiments may include identifying a polarity of a first magnetic element or a second magnetic element and a strength of a magnetic force generated by approaching of the second magnetic element to the first magnetic element, the polarity being determined by the magnetic force, the second magnetic element being included in an external electronic device, determining a power transmission scheme among a plurality of power transmission schemes, based on the polarity and the strength of the magnetic force, and wirelessly transmitting power to the external electronic device, based on the power transmission scheme.

The determining of the power transmission scheme may include determining a frequency of a ping signal and a frequency of a power transmission signal, based on the power transmission scheme.

The determining of the power transmission scheme may include outputting a signal for controlling a switch included in the electronic device, in order to determine the frequency of the ping signal and the frequency of the power transmission signal.

Each of the plurality of power transmission schemes may have different resonant frequencies of a ping signal and a power transmission signal.

The operating method of the electronic device may further include, based on identifying the magnetic force when the electronic device is in a sleep state, changing the sleep state to an active state.

The transmitting of the power may include comparing the strength of the magnetic force with a threshold value and detecting the external electronic device based on a determination that the strength of the magnetic force is greater than the threshold value.

The transmitting of the power may include outputting a ping signal having a frequency corresponding to the power transmission scheme.

The transmitting of the power may include, based on detecting the external electronic device, transmitting a power transmission signal having a frequency corresponding to the power transmission scheme to the external electronic device.

The operating method of the electronic device may further include comparing the strength of the magnetic force with a threshold value, and based on a determination that the strength of the magnetic force is less than or equal to the threshold value, changing the active state to the sleep state.

A computer-readable recording medium according to various embodiments may store instructions configured to, when executed, cause a processor to: identify a polarity of a first magnetic element or a second magnetic element and a strength of a magnetic force generated by approaching of the second magnetic element to the first magnetic element, the polarity being determined by the magnetic force, the first magnetic element being included in an electronic device and being rotatable in a first direction to have a polarity of a first pole or a second pole, the second magnetic element being included in an external electronic device; determine a power transmission scheme among a plurality of power transmission schemes, based on the polarity and the strength of the magnetic force; and wirelessly transmit power to the external electronic device, based on the power transmission scheme.

Each of the above-described elements of the electronic device may be configured by one or more components, and the name of the corresponding element may be changed according to the type of the electronic device. In various embodiments, the electronic device may include at least one of the above-described elements, and some of the elements may be omitted from the electronic device, or other additional elements may be further included in the electronic device. In addition, some of the elements of the electronic device according to various embodiments may be combined with each other to configure one entity, thereby making it possible to perform the functions of the corresponding elements in the same manner as before the combination.

Embodiments disclosed herein are provided merely to describe technical details of the disclosure and to help the understanding of the disclosure, and are not intended to limit the scope of the disclosure. Therefore, it should be construed that the scope of the disclosure includes any change or various other embodiments based on the technical idea of the disclosure.

The invention claimed is:

1. An electronic device comprising:
   a sensor;
   a first magnetic element which can be rotated to have one of a polarity of a first pole and a second pole in a first direction; and
   a processor,
   wherein the processor is configured to,
   identify, based at least in part on the sensor, a polarity of one of a first magnetic element and a second magnetic element and a strength of a magnetic force generated by approaching the second magnetic element to the first magnetic element, the polarity being determined by the magnetic force, the second magnetic element being included in an external electronic device,
   select a power transmission scheme from a plurality of power transmission schemes, based on at least in part on the polarity and the strength of the magnetic force, and
   wirelessly transmit power to the external electronic device, based on the power transmission scheme.

2. The electronic device of claim 1, wherein the processor is configured to determine a frequency of a ping signal and a frequency of a power transmission signal, based on the power transmission scheme.

3. The electronic device of claim 2, wherein the processor is configured to output a signal for controlling a switch included in the electronic device, in order to determine the frequency of the ping signal and the frequency of the power transmission signal.

4. The electronic device of claim 1, wherein each of the plurality of power transmission schemes has different resonant frequencies of a ping signal and a power transmission signal.

5. The electronic device of claim 1, wherein the processor is further configured to,
   based on identifying that a polarity of the magnetic force corresponds to the first pole, perform an operation of transmitting the power, based on a first power transmission scheme, and
   based on identifying that the polarity of the magnetic force corresponds to the second pole, perform an operation of transmitting the power, based on a second power transmission scheme different from the first power transmission scheme.

6. The electronic device of claim 1, wherein the processor is further configured to, based on identifying the magnetic force when the electronic device is in a sleep state, change the sleep state to an active state.

7. The electronic device of claim 1, wherein the processor is further configured to compare the strength of the magnetic force with a threshold value and start an operation of detecting the external electronic device based on a determination that the strength of the magnetic force is greater than the threshold value.

8. The electronic device of claim 7, wherein the processor is further configured to output a ping signal having a frequency determined based on the power transmission scheme.

9. The electronic device of claim 7, wherein the processor is further configured to, based on detecting the external electronic device, transmit a power transmission signal having a frequency determined based on the power transmission scheme to the external electronic device.

10. The electronic device of claim 6, wherein the processor is further configured to compare the strength of the magnetic force with a threshold value, and based on a determination that the strength of the magnetic force is less than or equal to the threshold value, change the active state to the sleep state.

11. An operating method of an electronic device comprising a first magnetic element which can be rotated to have a polarity of one or a first pole and a second pole in a first direction, the method comprising:
identifying a polarity of one of a first magnetic element and a second magnetic element and a strength of a magnetic force generated by approaching of the second magnetic element to the first magnetic element, the polarity being determined by the magnetic force, the second magnetic element being included in an external electronic device;
selecting a power transmission scheme from a plurality of power transmission schemes, based at least in part on the polarity and the strength of the magnetic force; and
wirelessly transmitting power to the external electronic device, based on the power transmission scheme.

12. The operating method of claim 11, wherein the determining of the power transmission scheme comprises determining a frequency of a ping signal and a frequency of a power transmission signal, based on the power transmission scheme.

13. The operating method of claim 12, wherein the determining of the power transmission scheme comprises outputting a signal for controlling a switch included in the electronic device, in order to determine the frequency of the ping signal and the frequency of the power transmission signal.

14. The operating method of claim 11, wherein each of the plurality of power transmission schemes has different resonant frequencies of a ping signal and a power transmission signal.

15. The operating method of claim 11, further comprising, based on identifying the magnetic force when the electronic device is in a sleep state, changing the sleep state to an active state.

16. A power transmission device comprising:
a sensor;
a first magnetic element; and
a processor,
wherein the processor is configured to:
identify, based at least in part of the sensor, a polarity of a second magnetic element of a power reception device disposed adjacent to the power transmission device;
select a power transmission scheme from a plurality of power transmission schemes, based on the polarity; and
wirelessly transmit power to the external electronic device, based on the power transmission scheme.

17. The power transmission device of claim 16, wherein the processor is further configured to determine a strength of a magnetic force generated by the second magnetic element on the first magnetic element, and wherein the selection of the power transmission scheme is further based on the strength of the magnetic force.

18. The power transmission device of claim 16, wherein the first magnetic element has an adjustable polarity.

19. The power transmission device of claim 18, wherein the processor is further configured to adjust the polarity of the first magnetic element based on the polarity of the second magnetic element.

20. The power transmission device of claim 16, wherein the processor is further configured to output a ping signal having a frequency determined based on the power transmission scheme.

* * * * *